(12) United States Patent
Leger et al.

(10) Patent No.: US 6,686,082 B2
(45) Date of Patent: Feb. 3, 2004

(54) FUEL CELL STACK

(75) Inventors: David Earl Leger, Chilliwack (CA); Shane Carver Black, Chilliwack (CA); Mark Chesley Mc Donald, Cultus Lake (CA)

(73) Assignee: Powerdisc Development Corp. Ltd., Chilliwack (CA)

( * ) Notice: Subject to any disclaimer, the term of this patent is extended or adjusted under 35 U.S.C. 154(b) by 76 days.

(21) Appl. No.: 10/013,405

(22) Filed: Dec. 6, 2001

(65) Prior Publication Data

US 2003/0108782 A1 Jun. 12, 2003

(30) Foreign Application Priority Data

Dec. 11, 2000 (CA) .............................. 2327962

(51) Int. Cl.⁷ .................................. H01M 8/10
(52) U.S. Cl. .............................. 429/30; 429/35; 429/38
(58) Field of Search .............................. 429/30, 34, 38, 429/39, 12, 35

(56) References Cited

U.S. PATENT DOCUMENTS

| | | | |
|---|---|---|---|
| 4,074,020 A | * 2/1978 | Regnaut | 429/34 |
| 5,686,199 A | * 11/1997 | Cavalca et al. | 429/30 |
| 5,804,326 A | 9/1998 | Chow et al. | |
| 5,879,826 A | * 3/1999 | Lehman et al. | 429/13 |
| 5,981,098 A | 11/1999 | Vitale | |
| 6,048,633 A | 4/2000 | Fujii et al. | |
| 6,080,502 A | 6/2000 | Nölscher et al. | |
| 6,099,984 A | 8/2000 | Rock | |
| 6,468,685 B1 | * 10/2002 | Yoshida | 429/34 |

* cited by examiner

*Primary Examiner*—Stephen Kalafut
*Assistant Examiner*—R Alejandro
(74) *Attorney, Agent, or Firm*—Brian Lee

(57) ABSTRACT

A fuel cell stack comprises fuel cell basic units, each of which including a gas diffuser/collector plate serving as an anode, an ion exchange membrane, disposed on top of the gas diffuser/collector plate and an air diffuser/collector plate serving as a cathode and disposed on top of the ion exchange membrane. The gas diffuser/collector has a face directed to the ion exchange membrane. This face is provided with a flow field incorporating a multiplicity of adjacent open-faced flow channels. Each open-faced flow channel has a cross-section continuously diminishing from its inlet to its outlet. The flow field, viewed from the top, forms a trapezoidal contour.

7 Claims, 9 Drawing Sheets

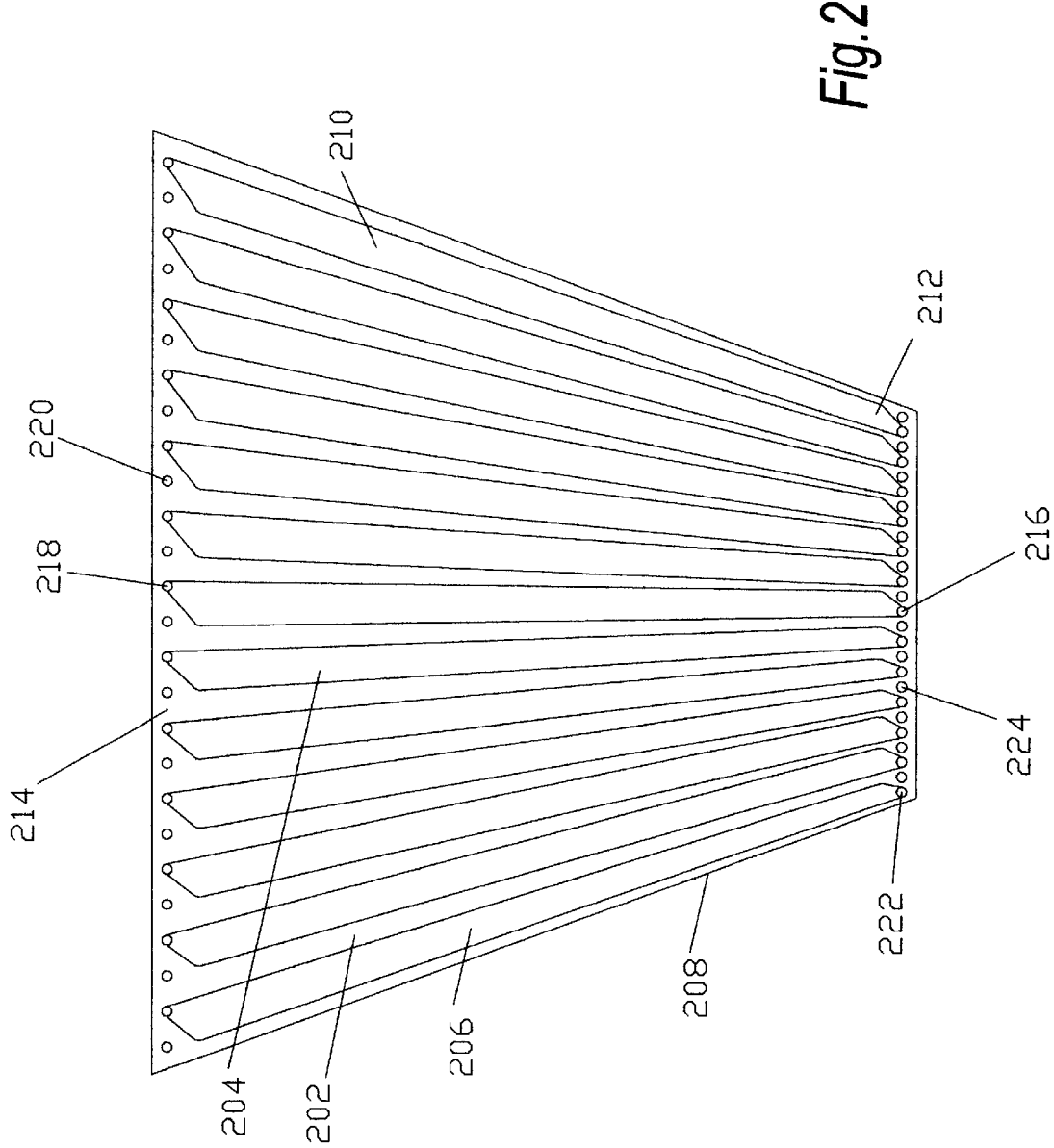

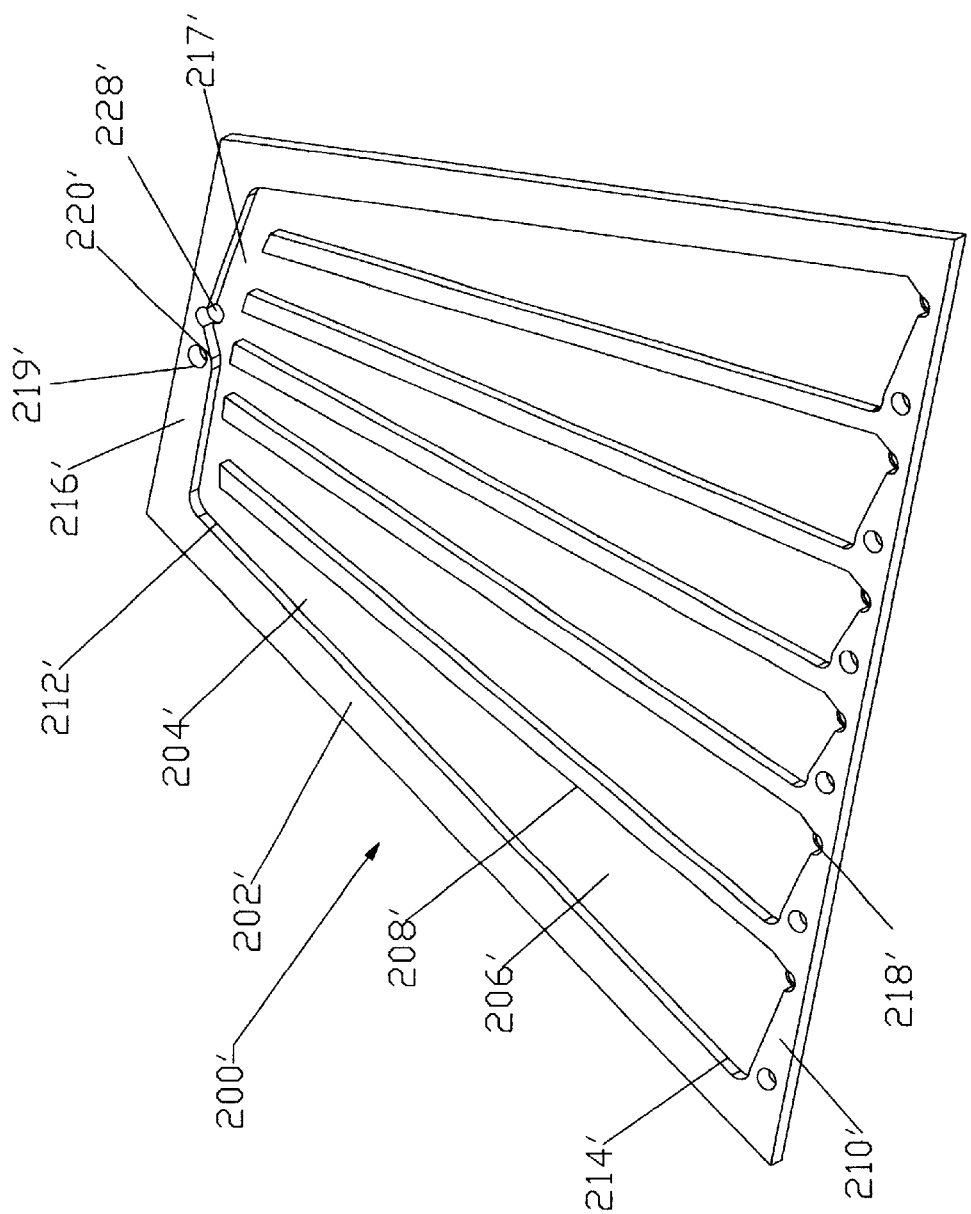

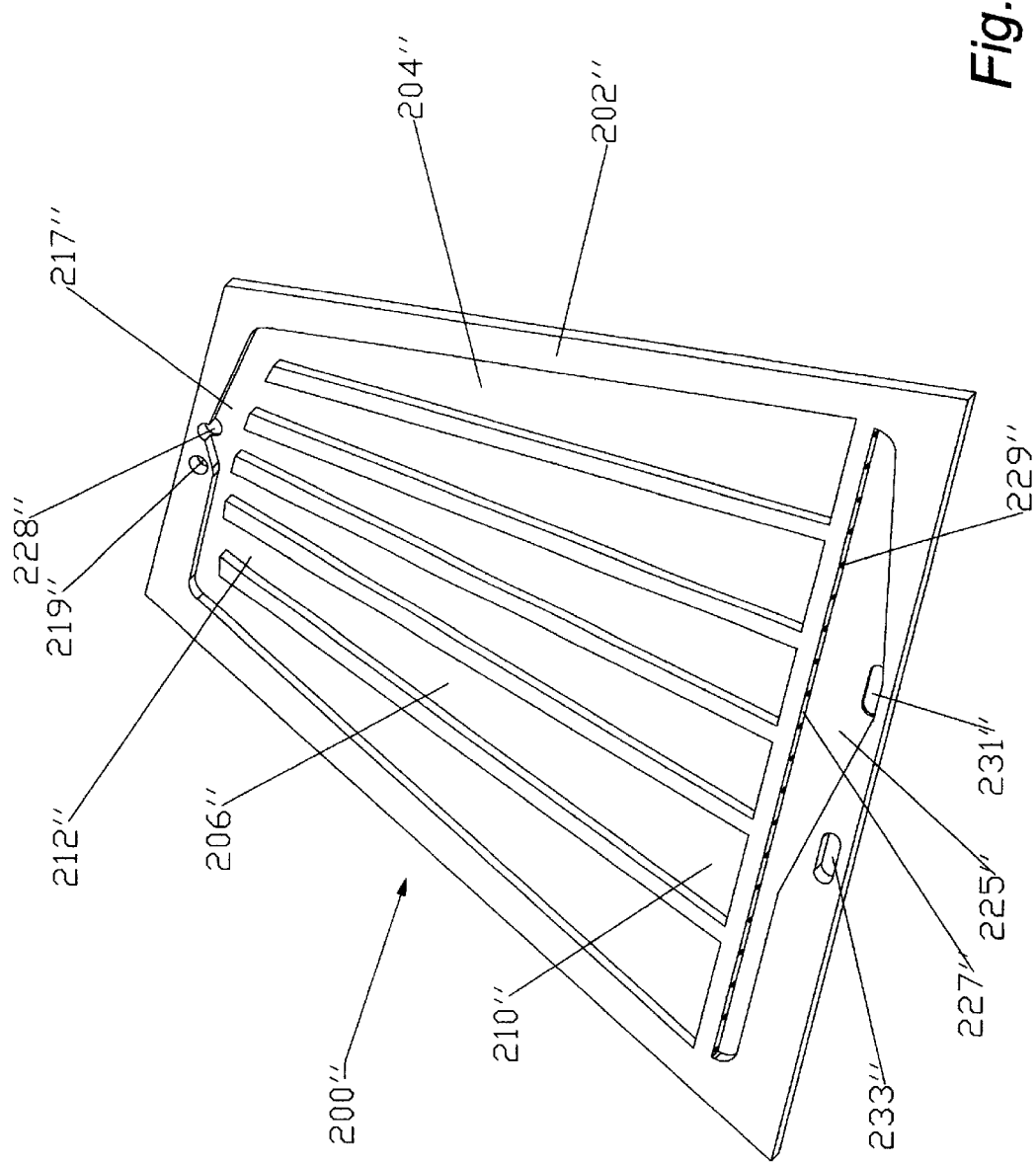
Fig. 2"

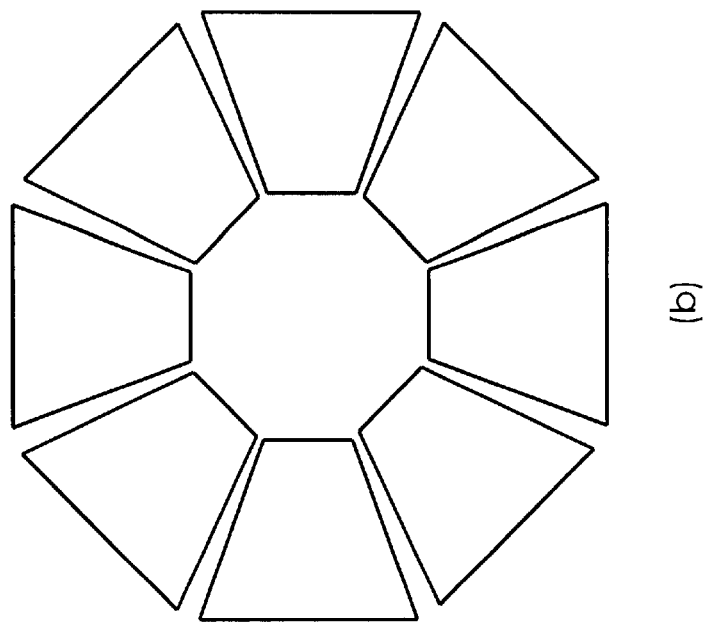
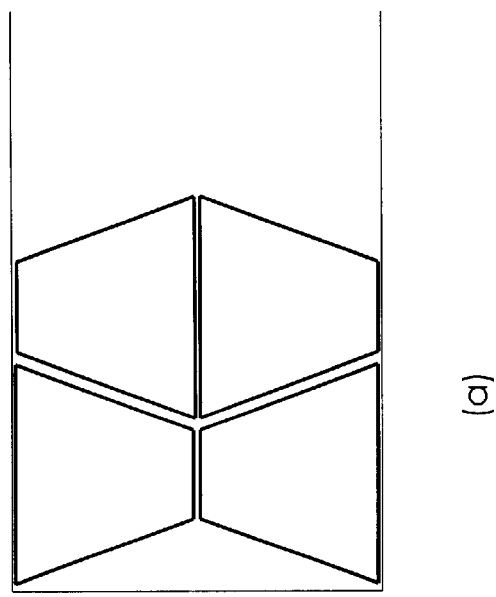
Fig. 6

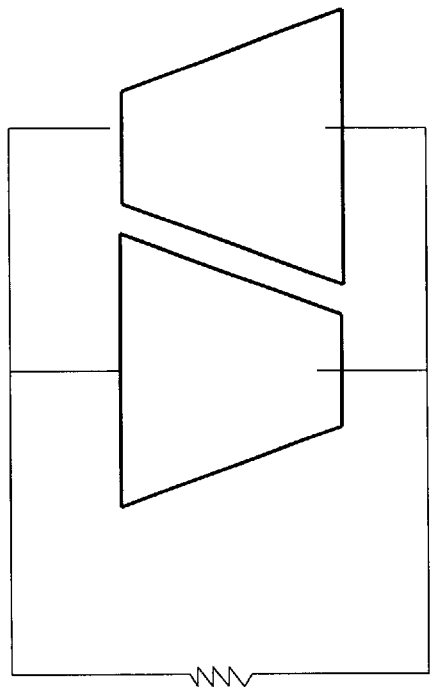
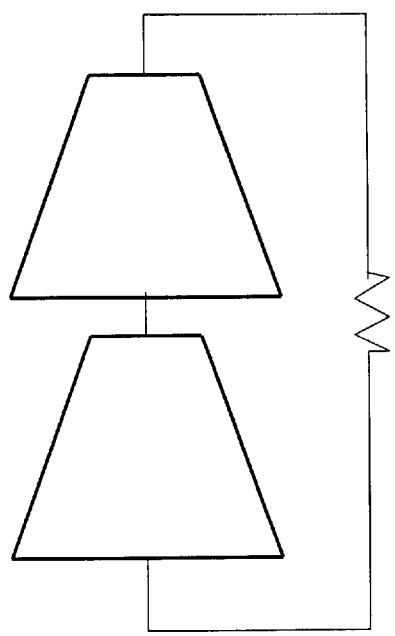
Fig. 7

FUEL CELL STACK

BACKGROUND OF THE INVENTION

1. Field of the Invention

This invention relates, generally, to fuel cell stacks and, more particularly, to fuel cell stacks incorporating fuel cell basic unit(s) using special gas diffuser/collector plates.

2. Description of Related Prior Art

Attempts have been made in the past to introduce a better gas diffuser/collector plate. Several related patents have addressed the issue. Thus, U.S. Pat. No. 6,099,984, dated Aug. 8, 2000 and granted to Rock for a "Mirrored serpentine flow channels for fuel cell" discloses a fuel cell using serpentine flow field channels. Thus, the input/inlet legs to each channel border the input/inlet of the next adjacent channels in the same flow field, and the output/exit legs of each channel borders the output/exit of the next adjacent channels in the same flow field. These type of channels is said to have one major disadvantage. The serpentine flow field channels in order to provide a uniform flow of fluid, requires an external increase of power. U.S. Pat. No. 6,048,633 dated Apr. 11, 2000 and granted to Fuji, et al., for a "Fuel cell stack" discloses a fuel cell stack comprising a first and second separators for holding a fuel cell therebetween. The first separator has a fuel gas flow passage and the second separator has an oxygen flow passage. The gas flow passages are formed by grooves, the number of grooves decreasing from the inlet to the outlet. In one embodiment, the gas flow passage comprises twelve individual gas flow passage grooves, which communicate with an inlet hole on gas inlet side, six individual second gas flow passage grooves which communicate with first gas flow passage grooves and three individual third gas flow passage grooves which communicate with the second gas flow passage grooves. The third flow passage grooves communicate with an outlet hole on a gas outlet side. The main disadvantage of the above separators resides in the fact that the surface occupied by the flow field, due to the use of grooves with constant cross section, is relatively large. U.S. Pat. No. 5,773,160 dated Jun. 30, 1998 and granted to Wilkinson et al. for an "Electrochemical fuel cell stack with concurrent flow of coolant and oxidant streams", describes a fuel cell stack having an anode, a cathode and cooling plates. Each plate comprises channels for directing a fluid stream from an inlet to an outlet. The coolant stream channels extend such, that in operation, the coolest region of the cooling plate coincides with the region of the cathode layer having the highest concentration of oxygen (and/or the lowest water content), and the warmest region of the cooling plate coincides with the region of the cathode plate having the lowest concentration of oxygen (and/or the highest concentration of water). The fuel stream channels extend such, that in operation the fuel stream is directed to a region of the cathode plate in which the oxidant stream has the lowest concentration of oxygen (and/or the highest concentration of water), and is subsequently directed to a region of the anode plate which coincides with the region of the cathode plate in which the oxidant stream has the highest concentration of oxygen (and/or the lowest water content). In its plate's configuration, Wilkinson et al., structure has an essential shortcoming. The channels having a constant cross section require an elevated pressure and hence, significant power is required.

SUMMARY OF THE INVENTION

There is accordingly a need for a fuel cell stack, which overcomes the above-mentioned disadvantages of prior art.

Thus, it is the primary objective of the present invention to provide an efficient fuel cell stack.

It is another objective of the present invention to provide a compact fuel cell stack.

Broadly stating, the fuel cell stack according to the present invention comprises at least one fuel cell basic unit containing a gas diffuser/collector plate serving as an anode, an ion exchange membrane disposed on top of the gas diffuser/collector plate and an air diffuser/collector plate serving as a cathode and disposed on top of the ion exchange membrane.

The gas diffuser/collector plate has a face directed to the ion exchange membrane which face is provided with a flow field incorporating a multiplicity of adjacent open faced flow channels. Each open-faced flow channel has a cross-section continuously diminishing from its inlet to its outlet, so the flow field, viewed from the top, forms a trapezoidal contour. The fuel cell stack further includes: a reactant manifold plate placed on the gas diffuser/collector plate, an oxidant manifold plate disposed on the reactant manifold plate, a first end sealing plate disposed beneath the gas diffuser/collector plate and a second end sealing plate disposed on top of the oxidant manifold plate. Furthermore, a fastening means is used.

The first and second end sealing plates, the reactant and oxidant manifold plates are all preferably provided with means for accommodating the fasteners.

In one aspect of the invention, the fuel cell stack, ion exchange membrane, air diffuser/collector plate, reactant and oxidant manifold plates, and the first and second end sealing plates are essentially similar in shape with the gas diffuser/collector plate. The assembled fuel cell stack has, basically, a trapezoidal form.

In another aspect of this invention, the fuel cell basic unit used in the above fuel cell stack has a gas diffuser/collector plate provided with a face directed to the ion exchange membrane. The face is provided with a flow field incorporating a multiplicity of adjacent open-faced flow channels has a cross section continuously diminishing so that larger and narrower ends are formed. Thus the flow field, viewed from the top forms a trapezoidal contour.

In another aspect of this invention, all the larger ends of the multiplicity of open-faced flow channels are adjacent to a wider side of the contour, while all the narrow ends of the multiplicity of the open-faced flow channels are adjacent to a narrow side of the contour. Each larger end of each open-faced flow channel is inclined with respect to the wider side of the contour, while each narrow end of each open-faced flow channel is inclined with respect to the narrow side of the contour.

In yet another aspect of the present invention, proximate to each extremity of the larger end of each open-faced flow channel, an inlet port is provided: a first inlet port, situated in the interior of each open-faced flow channel and a second inlet port, situated outside each open-faced flow channel.

All first and second inlet ports are collinear.

Proximate to each extremity of the narrow end of each open-faced flow channel an outlet port is disposed. A first outlet port is disposed in the interior of each open-faced flow channel; a second outlet port is disposed outside each open-faced flow channel.

All first and second outlet ports are collinear.

In a first variant of the gas diffuser/collector all large ends of all open-faced flow channels are adjacent to a wider side of the contour. All narrow ends of all open-faced flow channels are adjacent to a narrow side of the contour. Each large end of each open-faced flow channel is inclined with respect to the wider side of the contour. All narrow ends of the open-faced flow channels communicate directly with a common recess. In the latter a drain hole is located. Outside the common recess a gas-expelling aperture is disposed. Proximate to each extremity of the large end of each open-faced flow channel an inlet port is provided: a first inlet port situated in the interior of each open-faced flow channel, a second inlet port situated outside each open-faced flow channel. All first and second inlet ports are collinearly located.

In a second variant of the gas diffuser/collector, a supply recess is located near all larger ends. In a wall of the supply recess, close to the large end, a series of communicating holes is provided. The latter connects the supply recess with the open-faced flow channels. In the supply recess a supply hole is disposed. Outside supply recess a gas supply aperture is located. All the narrow ends of all the open-faced flow channels communicate directly with a common recess. In the interior of the latter a drain hole is placed. Outside the common recess a gas-expelling aperture is provided.

BRIEF DESCRIPTION OF THE DRAWINGS

Although the characteristic features of this invention will particularly pointed out in the claims, the invention itself, and the manner in which it may be made and used, may be better understood by referring to the following description taken in connection with the accompanying drawings forming part hereof, wherein like reference numerals refer to like parts throughout the several views in which:

FIG. 2 illustrates a top view of a gas diffuser/collector plate;

FIG. 2' illustrates an isometric view of a first variant of the gas diffuser/collector plate of FIG. 2;

FIG. 2" illustrates an isometric view of a second variant of the gas diffuser/collector plate of FIG. 2;

FIG. 6 illustrates a schematic view of an open (a) or closed (b) arrangement of several of fuel cell stacks; and FIG. 7 illustrates schematically electrical outputs connected in series (a), parallel (b) or combination thereof.

DESCRIPTION OF THE PREFERRED EMBODIMENTS

It should be noted that the following use of terms such as top, bottom, front, back, etc., is for the purpose of providing relative reference only, and not intended to suggest any limitations on how the fuel cell basic unit 100 may be positioned or mounted as an entity or in an assembly.

Figure 1:
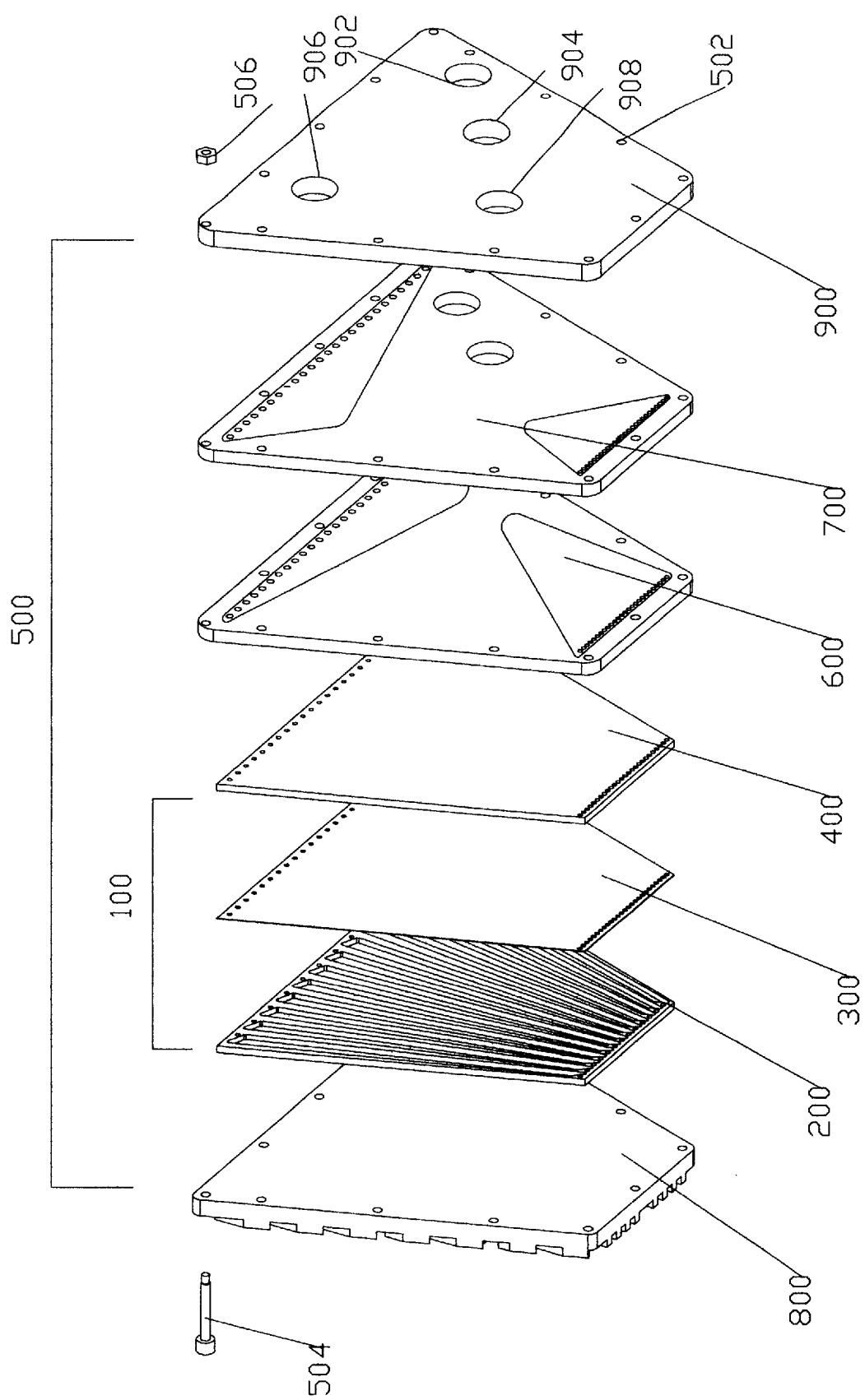
FIG. 1 illustrates an exploded isometric view of a fuel cell stack incorporating a fuel cell basic unit.
Figure 3:
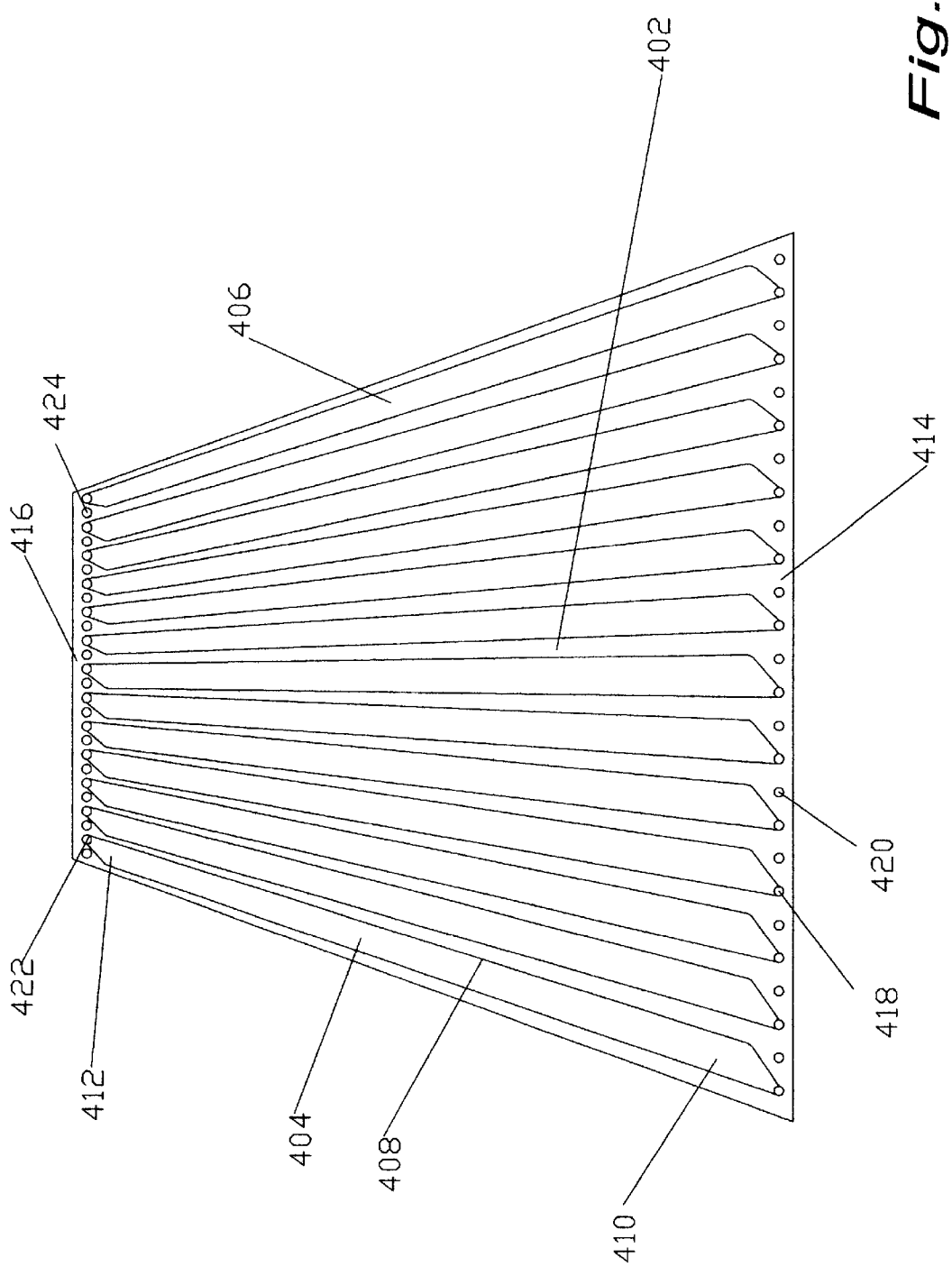
FIG. 3 illustrates a top view of an air diffuser/collector plate.
Figure 4:
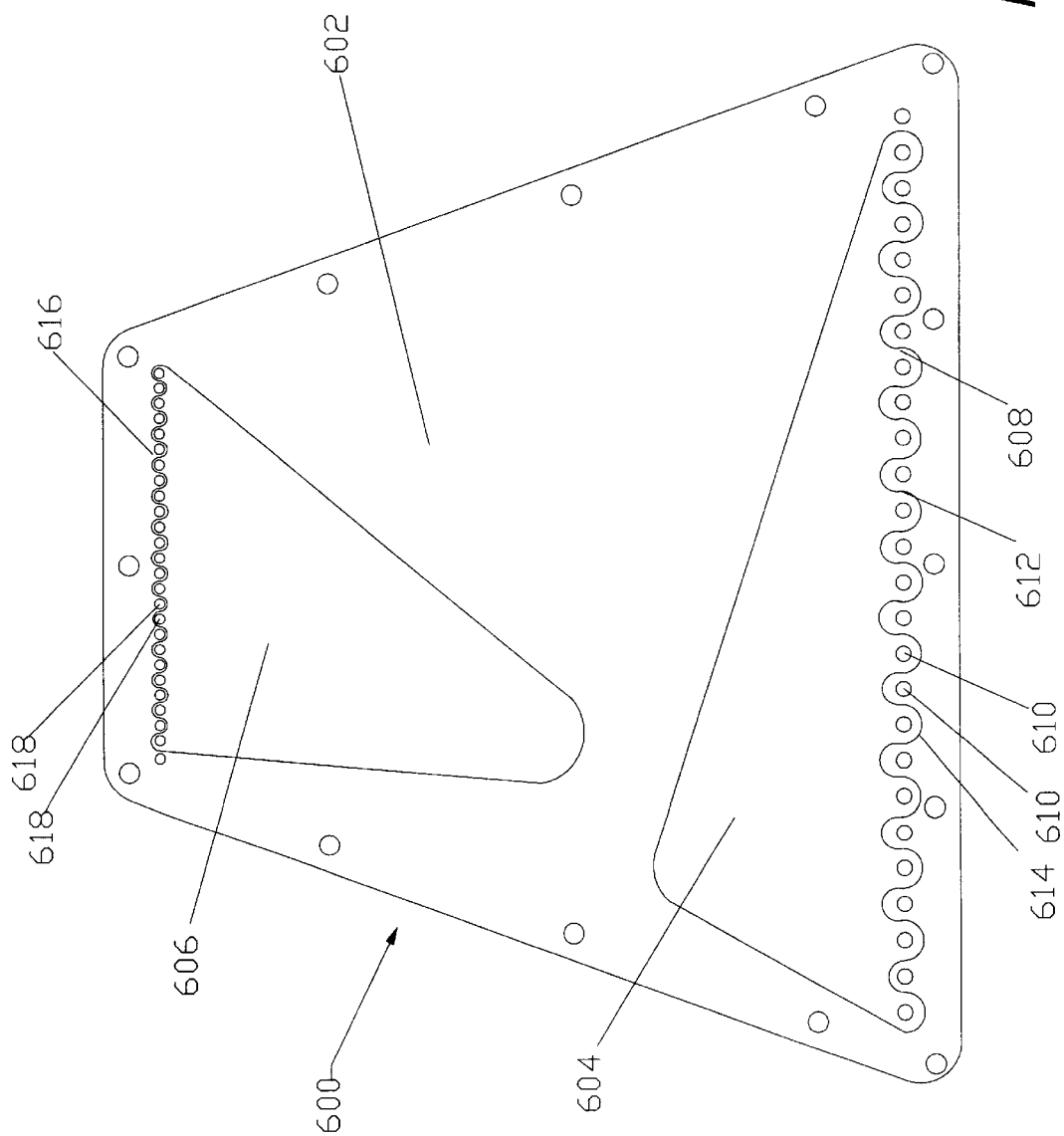
FIG. 4 illustrates a top view of reactant manifold plate.
Figure 5:
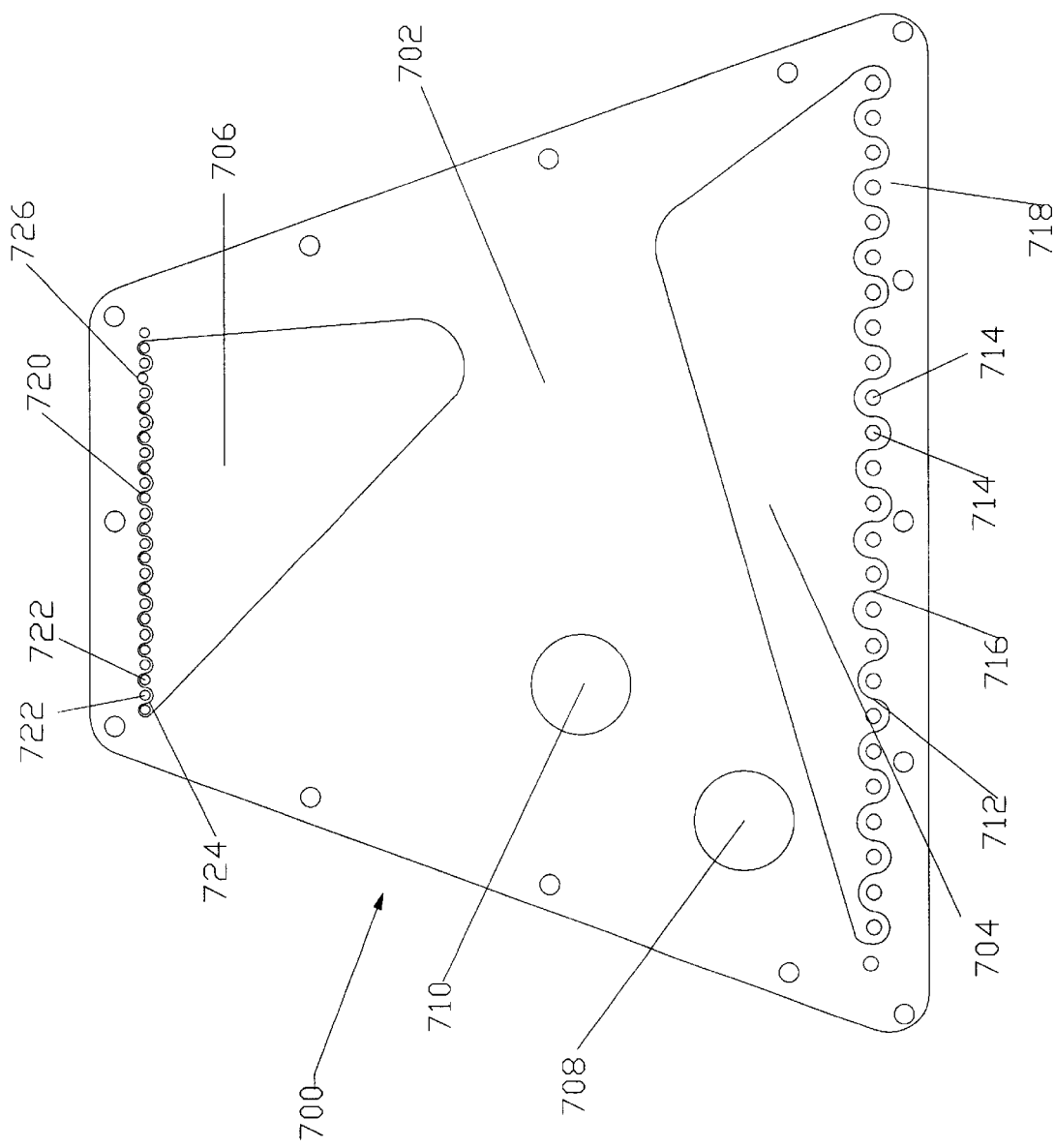
FIG. 5 illustrates a top view of oxidant manifold plate.

FIG. 1 broadly depicts a fuel cell basic unit 100 comprising a gas diffuser/collector plate 200 serving as an anode, an ion exchange membrane 300, disposed on top of a gas diffuser/collector plate 200 and an air diffuser/collector plate 400, serving as a cathode and disposed on a top of ion exchange membrane 300.

Usually, a plurality of successive fuel cell basic units 100 is employed to form a fuel cell stack 500. It is obvious that the that the number of fuel cell basic units 100 and there size determines the amount of electrical power of the fuel cell stack 500

In the latter, a reactant (i.e. hydrogen) manifold plate 600 is placed on top of a last air diffuser/collector plate 400 of a plurality of successive fuel cell basic units 100 stacked on each other.

An oxidant (i.e. oxygen) manifold plate 700 is disposed on reactant manifold plate 600 A first end sealing plate 800 is disposed beneath last gas diffuser/collector plate 200 of a plurality of successive fuel cell basic units 100. A second end sealing plate 900 is disposed on a top of an oxidant manifold plate 700.

First and second end sealing plates 800 and 900, reactant manifold plate 600, oxidant manifold plate 700 are all peripherally provided with bolt openings 502. A plurality of bolts 504, passing through bolt openings 502 and using nuts 506, is used for assembling and sealing fuel cell stacks 500.

To better understand the present invention reference is made to FIGS. 2 through 5, which depict in detail its different components.

Gas diffusion/collector plate 200 (see FIG. 2) has a face 202 directed toward an ion exchange membrane 300. In face 202 is provided a flow field 204 containing a multiplicity of open-faced flow channels 206 is provided. Flow field 204, viewed from the top, is delimited by a trapezoidal contour 208. Each open-faced flow channel 206 has a variable cross section characterized by a large end 210 and a narrow end 212. This variable cross section continuously diminishes from an inlet to an outlet of each open-faced flow channel 206.

All larger ends 210 of a multiplicity of open-faced channels 206 are adjacent to a wider side 214 of contour 208, while all narrow ends 212 are adjacent to a narrow side 216 of contour 208.

Each larger end 210 of each open-faced flow channel 206 is inclined with respect to wider side 214 of contour 208, while each narrow end 212 of each open-faced flow channel 206 is inclined with respect to narrow side 216 of contour 208.

Proximate to each extremity of larger end 210 of open-faced flow channel 206 an inlet port is provided: a first inlet port 218 situated in the interior of open-faced flow channel 206, and a second inlet port 220 situated outside open-faced channel 206.

All first and second inlet ports 218 and 220 are collinear.

Proximate to each extremity of narrow end 212 of an open-faced flow channel 206 an outlet port is provided: a first outlet port 222 situated in the interior of each open-faced flow channel 206 and a second outlet port 224 situated outside each open-faced flow channel 206.

All first and second outlet ports 222 and 224 are collinear.

Ion exchange membrane 300 (see FIG. 1) is of conventional type and contains a proton exchange membrane with surfaces coated with catalyst/carbon/binder layers. When assembled in a fuel cell basic unit 100 ion exchange membrane is sandwiched by gas diffuser/collector plate 200 and air diffuser/collector plate 400.

Air diffuser/collector plate 400 (see FIG. 3) has a surface 402 directed towards ion exchange membrane 300 and is structurally and functionally compatible with flow field plate 204 of gas diffuser/collector plate 200. Thus, surface 402 comprises of a flow field 406 containing a multiplicity of open-faced flow channels 406. Flow field 404, viewed from a top, is delimited by a trapezoidal contour 408.

Each open-faced channel 406 has a variable cross section characterized by a large end 410 and a narrow end 412.

All larger ends 410 of the multiplicity of open-faced channels 406 are adjacent to a wider side 414 of contour 408, while all narrow sides 416 of contour 408 are adjacent to a narrow side 416 of contour 408.

Each larger end 410 of each open-faced flow channel 406 is inclined with respect to wider side 414 of contour 408, while each narrow end 412 of each open-faced flow channel 406 is inclined with respect to narrow side 416 of contour 408.

Proximate to each extremity of larger end 410 of an open-faced flow channel 406 an inlet port is provided: a first inlet port 418 situated in the interior of open-faced channels 406, a second inlet port 420 situated outside open-faced flow channel 406.

All first and second 418 and 420 inlet ports are collinear.

Proximate to each extremity of narrow end 412 of an open-faced flow channel 406 an outlet port is provided: a first outlet port 422 situated in the interior of each open-faced flow channel 406 and a second outlet port 424 situated outside each open-faced channel 406.

All first and second outlet ports 422 and 424 are collinear.

Reactant manifold plate 600 has a lateral face 602, directed to a face of air diffuser/collector plate 400 opposed to face 402, provided with a first recessed zone 604 for distributing a reactant and a second recessed zone 606 for collecting an exhaust gas. First recessed zone 604 has an edge 608 adjacent to a plurality of distribution apertures 610. Edge 608 is formed from a succession of inward and outward bends 612 and 614, respectively. The plurality of distribution apertures 610 is arranged in such a manner, that one aperture located in first recessed zone 604 is followed by another aperture located outside first recessed zone 604 and conversely.

The plurality of distribution apertures 610 is collinearly disposed.

Second recessed zone 606 has an edge 616 adjacent to a plurality of collection apertures 618. Edge 616, like edge 608 of first recessed zone 604, is formed from a plurality of inward and outward bends 612 and 614, respectively. The plurality of collection apertures 618 is arranged in such a manner, that one collection aperture 618 located in second recessed zone 606 is followed by another collection aperture 618 located outside second recessed zone 606 and conversely.

The plurality of collection apertures 618 is collinearly disposed.

Oxidant manifold plate 700 (see FIG. 5) has a lateral face 702 directed to a face opposed to face 602 of reactant manifold plate 600, and a first and second recessed zones 704 and 706, respectively, which are mirror images of first and second recessed zones 604 and 606.

First recessed zone 704 has an edge 712 adjacent to a plurality of distribution apertures 714. Edge 712 is formed as a succession of inward and outward bends 716 and 718, respectively. The plurality of distribution apertures 714 is arranged in such a manner that one distribution aperture 714 located in first recessed zone 704 is followed by another distribution aperture 714 located outside first recessed zone 704.

Second recessed zone 706 has an edge 720 adjacent to a plurality of collection apertures 722. Edge 720 is formed as a plurality of inward and outward bends 724 and 726, respectively. The plurality of collection apertures 722 is arranged in such a manner, that one collection aperture disposed in second recessed zone 706 is followed by another collection aperture 722 disposed outside second recessed zone 706.

Additionally, in lateral surface 702, first and second transfer apertures 708 and 710, situated outside first and second recessed zones 704 and 706, respectively, are provided. First transfer aperture 708 communicates with first recessed zone 604 of reactant manifold plate 600, while second transfer aperture 710 communicates with second recessed zone 606 of the same reactant manifold plate 600.

First sealing plate 800, as stated above, is disposed beneath gas diffuser/collector plate 200 and serves, besides sealing, as a basis on which all components of fuel cell stack 100 are placed to form a complete assembly.

Second sealing plate 900 is provided with several orifices. A first orifice 902 is located to communicate, through first transfer aperture 706, with first recessed zone 604. A second orifice 904 is located to communicate, through second transfer aperture 706, with second recessed zone 606. A third orifice 906 communicates with first recessed zone 704 in oxidant manifold plate 700. A fourth orifice 908 communicates with second recessed zone 706 in oxidant manifold plate 700.

When fuel cell stack 500 is assembled, it forms a prism. Since gas diffuser/collector plate 200 is provided with flow field 204, which is characterized by trapezoidal contour 208, the shape of gas diffuser/collector plate 200 impliedly will be proportionately configured. Accordingly for design purposes, ion exchange membrane 300, air diffuser/collector plate 400, reactant manifold plate 600, oxidant manifold plate 700 and first and second end sealing plate 800 and 900 respectively, are similar in shape with gas diffuser/collector plate 200.

Thus fuel cell stack 500 in the above-described embodiment has the form of a trapezoidal prism.

Alternatively to gas diffusion/collector plate 200 described in the above-preferred embodiment, other similar variants are provided herein;

In a first variant (see FIG. 2') a gas diffuser/collector plate 200' has a face 202' directed toward ion exchange membrane 300. In face 202' a flow field 204' containing a multiplicity of adjacent open-faced flow channels 206' is provided. Flow field 204' viewed from the top, is delimited by a trapezoidal contour 208'. Each open-faced flow channel 206' has a variable cross-section characterized by a large end 210' and a narrow end 212'. This variable cross-section continuously diminishes from an inlet to an outlet of each open-faced flow channel 206'. All larger ends 210' are adjacent to a wider side 214' of contour 208', while all narrow ends 212' are adjacent to a narrow side 216' of contour 208'.

Each larger end 210' of each open-faced flow channel 206' is inclined with respect to a wider side 214' of contour 208' while all narrow ends 212' of each open-faced channel 206' communicate directly with a common recess 217'. In the latter a drain hole 218' is provided. Outside common recess 217' a gas expelling aperture 219' is provided.

Proximate to each extremity of larger end 210' of open-faced flow channel 206' an inlet port is provided: a first inlet port 218' situated in the interior of each open-faced flow channel 206' and a second inlet port 220' situated outside open-faced channels 206'.

In a second variant a gas diffuser/collector plate 200" has a face 202" directed toward ion exchange membrane 300. In face 202" a flow field 204" containing a multiplicity of adjacent open-faced flow channels 206" is provided. Flow field 204" viewed from the top, is delimited by a trapezoidal contour 208". Each open-faced flow channel 206" has a variable cross-section characterized by a large end 210" and a narrow end 212". A supply recess 225 is located near all larger ends 210". In a wall 227 of supply recess 225, close to larger end 210", a series of communicating holes 229 is provided. The latter connects supply recess 225 with open-faced flow channels 206". In supply recess 225 a supply hole 231 is provided. Outside of supply recess 225 a gas supply aperture 233 is provided. All narrow ends 212" of open-faced flow channels 206" communicate directly with a common recess 217'. In the latter a drain hole 218' is provided. Outside common recess 217' a gas-expelling aperture 219' is provided.

It is obvious that when us is made of the above alternatives structures of gas diffuser/collector plates, the ion exchange membrane 300 and manifold plates 600 and 700 will be accordingly compatible.

Fuel cell stack 500 operates as follows:

A reactant gas (i.e.: hydrogen) is supplied through first orifice 902 of second end sealing plate 900. First transfer aperture 704 of oxidant manifold plate 700, to first recessed zone 604. From the latter the reactant enters into those distribution apertures 610 of the plurality of distribution apertures 610 which are located in the interior of first recessed zone 604.

From the latter distribution aperture 610 disposed in the interior of the first recessed zone 604, the reactant reaches the gas diffuser/collector plate 200. The latter being superimposed with ion exchange membrane 300, the reactant between them is converted to ion form, the resulting ions being expelled towards the air diffuser/collector plate 400 and the remaining electrons are excited to an external circuit, as is known in the art of fuel cell construction.

The convergence of open-faced flow channels 206 of flow field 204 allows an increase in the velocity of the fuel during its passage through open-faced flow fields 206. During the above process described, part of the reactant becomes residual and is expelled through first outlet ports 222 of gas diffuser/collector plate 200 to collection aperture 618 disposed in second recessed zone 606, the residual reactant than exits through second transfer aperture 706 to be recycled.

Simultaneously, with the above process, an oxidant is supplied through third orifice 906, first recessed zone 704 of oxidant manifold plate 700 and further through the plurality of distribution apertures 714 which are located in the interior of first recessed zone 704 From the latter distribution aperture 714 disposed inside of first recessed zone 704, the oxidant reaches the air diffuser/collector plate 400. The latter being superimposed with ion exchange membrane 300, the oxidant within them combines with the fuel ions, the resultant water being expelled through outlet ports 422 and enters collection apertures 618 situated outside second recessed zone 606. Further, water enters second recessed zone 706 via a plurality of collection apertures 722 situated inside second recessed zone 706. Form their water exits through third orifice 906.

In order to obtain a greater output of electrical power, several fuel cell stacks 500 are combined together in an open or closed succession (FIG. 6).

In the above-mentioned cases, each succession can be formed from several groups of fuel cell stacks 500, which have electrical outputs connected in series, parallel or a combined thereof (FIG. 7).

As required, detailed embodiments of the present invention is disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure.

The embodiments of the invention in which an exclusive property or privilege is claimed are defined as follows:

1. Fuel cell stack, comprising, in combination,
   at least one fuel cell basic unit containing
      a gas diffuser/collector plate serving as an anode;
      an ion exchange membrane, disposed on top of said gas diffuser/collector and an air diffuser/collector plate serving as a cathode and disposed on top of said ion exchange membrane;
         said gas diffuser/collector plate having a face directed to said ion exchange membrane, said face being provided with a flow field incorporating a multiplicity of open-faced flow channels, each said open-faced flow channel having a cross-section continuously diminishing from its inlet to its outlet, so said flow field, viewed from the top, forms a trapezoidal contour;
   said fuel cell stack further including:
      a reactant manifold plate placed on said gas diffuser/collector plate;
      an oxidant manifold plate on said reactant manifold;
      a first end sealing plate disposed beneath said gas diffuser/collector plate;
      a second end sealing plate disposed on top of said oxidant manifold plate;
   fastening means;
      said first and second end sealing plates, said reactant manifold plate and
      said oxidant manifold plate are all preferentially provided with means for accommodating said fastening means.

2. Fuel cell stack as defined in claim 1, wherein said ion exchange membrane, air diffuser/collector plate, said reactant manifold plate, said oxidant manifold plate and first and second end sealing plates are essentially similar in shape with said gas diffuser/collector plate whereby said fuel cell stack has basically the shape of a trapezoidal prism.

3. Fuel cell basic unit for use in fuel cell stack, comprising;
   a gas diffuser/collector plate serving as an anode;
   an ion exchange membrane disposed on top of said gas diffuser/collector plate;
   an air diffuser/collector plate serving as a cathode and disposed on top of said ion exchange membrane;
   said gas diffuser/collector plate having a face directed to said ion exchange membrane, said face being provided with a flow field incorporating a multiplicity of adjacent open-faced flow channels, each said open-faced flow channel having a cross-section continuously diminishing so that a larger and narrow ends are formed, said flow field, viewed from the top forming a trapezoidal contour.

4. Fuel cell basic unit as defined in claim 3, wherein all said larger ends of said multiplicity of open-faced flow channels are adjacent to a wider side of said contour while all said narrow ends of said multiplicity of open-faced channels are adjacent to a narrow side of said contour, each said larger end of each said open-faced flow channel being inclined with respect to said wider side of said contour, while each said narrow end of each of said open-faced channels is inclined with respect to said narrow side of said contour.

5. Fuel cell basic unit, as defined in claim 3, further comprising proximate to each extremity of said larger end of each said open-faced flow channel an inlet port is provided;

a first inlet port situated outside said open-faced flow channel;

a second inlet port situated outside said open-faced flow channel;

all first and second inlet ports are collinear;

and proximate to each extremity of said narrow end of each said open-faced channel an outlet port is situated;

a first outlet port situated in the interior of each said open-faced flow channel;

a second outlet port situated outside said open-faced flow channel;

all first and second outlet ports being collinear.

6. Fuel cell basic unit, as defined in claims 3, wherein all said larger ends are adjacent to a wider side of said contour, while all said narrow ends are adjacent to a narrow side of said contour, each said larger end of each said open-faced flow channel being inclined with respect to said wider side of said contour, while all said narrow ends of said open-faced flow channels communicate directly with a common recess, in said common recess a drain hole being located, and outside said common recess a gas expelling aperture being disposed, proximate to each extremity of said large end of each open-faced flow channel an inlet port being provided: a first inlet port situated in the interior of each said open-faced flow channel and a second inlet port situated outside each said open-faced channel, all said first and second inlet ports being collinearly located.

7. Fuel cell basic unit as defined in claim 3, wherein a supply recess is located near all said large ends, and in a wall of said supply recess, close to said large ends, a series of communicating holes being provided, said series of communicating holes connecting said supply recess with said open-faced flow channels, a supply hole being disposed in said supply recess and a gas supply aperture being disposed outside said supply recess, all said narrow ends of all said open-faced flow channels communicating directly with a common recess, in the interior of the latter a drain being located and outside said common recess a gas expelling aperture being provided.

* * * * *